Patented Mar. 4, 1952

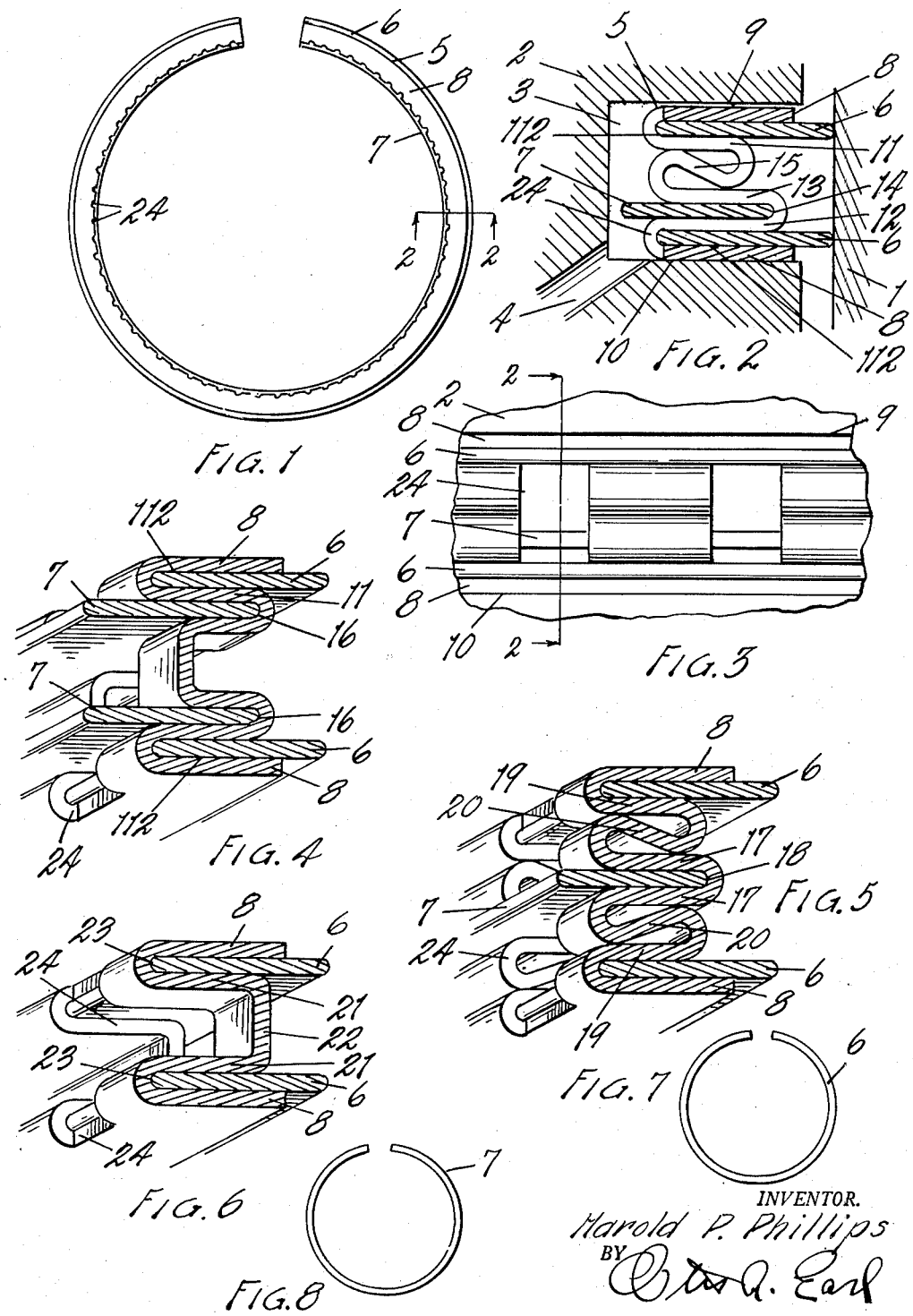

2,587,888

UNITED STATES PATENT OFFICE 2,587,888

COMPOSITE PISTON RING ASSEMBLY

Harold P. Phillips, Hastings, Mich., assignor to Hastings Manufacturing Company, Hastings, Mich.

Application April 3, 1950, Serial No. 153,740

14 Claims. (Cl. 309—45)

This invention relates to improvements in composite piston ring assembly.

The main objects of this invention are:

First, to provide a composite piston ring assembly particularly adapted for use in internal combustion engines.

Second, to provide a highly resilient piston ring assembly which is adapted for use in piston ring grooves of varying depths inasmuch as its expansibility does not depend on an expander element supported on the bottom of the piston ring groove.

Third, to provide a composite piston ring assembly having cylinder wall contacting elements, an expander element formed of thin ribbon steel stock coiled edgewise and one in which such element is effectively suported against dishing and twisting.

Fourth, to provide an assembly of the type described in which all of the elements are capable of being manufactured, handled and installed and operated effectively without danger of breakage.

Objects relating to details and economies of the invention will appear from the description to follow. The invention is pointed out in the claims.

A preferred embodiment of the invention is illustrated in the accompanying drawings, in which:

Fig. 1 is a side elevational view of a piston ring assembly embodying my invention.

Fig. 2 is an enlarged sectional view on a line corresponding to line 2—2 of Figs. 1 and 3 installed in a piston ring groove and in operative relation to a cylinder wall which parts are shown conventionally and without regard to proportions and clearances.

Fig. 3 is a fragmentary elevational view of the assembly installed in a piston ring groove.

Fig. 4 is a fragmentary perspective view of a modified form or embodiment of my invention.

Fig. 5 is a fragmentary perspective view of another modification or embodiment of my invention.

Fig. 6 is a fragmentary perspective view of a further modification or embodiment of my invention.

Fig. 7 is a side elevational view (reduced in size) of one of the cylinder wall contacting elements.

Fig. 8 is a side elevational view (reduced in size) of one of the expander elements.

In the accompanying drawing, 1 represents a cylinder and 2 a piston having a piston ring groove 3 therein provided with a drain opening 4. It should be understood that in the accompanying drawing I have not attempted to illustrate parts in proportions or tolerances or clearances and except for Figs. 1, 7 and 8 the parts are shown very substantially enlarged. In the embodiment of my invention illustrated all of the parts are fabricated or formed of steel or other suitable ductile metal stock as distinguished from castings.

The ring assembly of my invention illustrated in Figs. 1, 2 and 3 comprises a combined carrier and spacer member designated generally by the numeral 5, a pair of cylinder wall contacting elements 6—6 and an expander spring element 7. The combined carrier and spacer member is desirably formed of ductile ribbon stock, a mild or relatively soft steel being commercially used and a thickness of the order of .016 being suitable. This ribbon stock is folded longitudinally upon itself providing a pair of parallel side members 8 which coact with the top and bottom sides 9 and 10 of the piston ring groove when the assembly is installed.

The reaches 11 and 12 of the intermediate folds adjacent the side members 8 are disposed in spaced parallel relation thereto to provide outwardly facing narrow grooves 112 receiving the major portions of the cylinder wall contacting elements 6. The intermediate fold reach 13 adjacent the fold reach 12 is disposed in spaced parallel relation to the fold reach 12 to provide the inwardly facing groove 14 receiving the major portion of the expander element 7. The reach 15 intermediate the reaches 11 and 13 constitutes an axial thrust member.

The cylinder wall contacting elements 6 are formed of ribbon steel coiled edgewise and of a thickness of the order of .010 to .016 of an inch. These elements are split and resilient and when installed are in radial supported engagement with the bottoms of the outwardly facing grooves and in side supported engagement with the side walls of the grooves. This arangement supports the segments or element 6 against dishing and twisting or kinking when the assembly is under compression as when installed in working relation to a cylinder. When formed of this thickness of stock the cylinder wall engaging elements dish or buckle and twist when they are compressed from their normal open position as shown in Fig. 7. The expander element 7 is also formed of ribbon stock coiled edgewise and may be formed and desirably is formed of the same gauge of ribbon stock but it may be thicker if desired. However, one of the features of my invention is to provide an efficient ring assembly which is of light weight and at the same time has the desired cylinder wall engaging pressure. The thin cylinder wall engaging segments or elements provide a highly efficient contact with the cylinder wall and as the unit pressure is directly related to the cylinder contacting area the desired unit pressure can be had with the parts formed of the light stock, as stated.

In the embodiment shown in Fig. 4 the combined carrier and spacer member is formed of ductile stock folded reversely upon itself to provide the side members 8, a pair of outwardly facing grooves 112 for the cylinder wall contacting elements 6 and a pair of inwardly facing grooves 16 corresponding to the groove 14 and adapted to receive a pair of expander elements 7. The walls of the grooves coact with the elements 6 and 7 to prevent their twisting and dishing. If the expander elements twist and dish they have little expanding tension but when properly supported, as in my embodiments illustrated, they serve as highly resilient and effective expanders and without bottoming on the piston ring groove which is a desirable feature as it enables the assembly being used successfully in grooves of varying depths. Further, the unit is merchandised as a completely assembled unit.

In the embodiment of my invention shown in Fig. 5 the combined carrier and spacer is adapted for a wider groove than that shown in Figs. 2 and 3 and in this embodiment the spaced parallel fold reaches 17, which coact to provide the expander groove 18, are each connected to the adjacent cylinder wall groove reaches 19 by inclined spacer reaches 20. In the embodiment shown in Fig. 6, which is well adapted for a narrow groove, the reaches 21 are connected by axially disposed portions 22, there being no intermediate folds.

This structure provides a pair of outwardly facing grooves 23 for the cylinder wall contacting elements and is adapted to support the elements in a way to prevent kinking and dishing or twisting thereof. This assembly may be used in a sinuously bent expander if desired.

All the embodiments illustrated are designed as oil rings and the combined carrier and spacer member has angularly spaced transverse slots 24 in the intermediate folds. These slots not only provide for oil drainage but facilitate the flexing or conforming of the assembly to cylinders which may be worn somewhat out-of-round.

I have illustrated and described my invention in a highly practical commercial embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. A piston ring comprising an annular split combined carrier and spacer member formed of ductile ribbon stock folded longitudinally providing axially spaced side members adapted to coact with the side walls of a piston ring groove in which the assembly is installed and intermediate folds joined to the inner edges of the side members, the reaches of the intermediate folds adjacent the side members being disposed in spaced relation to the side members and coacting therewith to provide outwardly facing cylinder wall contacting element grooves, certain of the adjacent reaches of the folds of the carrier member being disposed in spaced relation to each other providing an inwardly facing expander element groove, annular thin split resilient cylinder wall engaging elements formed of ribbon steel coiled edgewise and of a thickness of the order of .010 to .016 of an inch disposed in said outwardly facing grooves in radial supported engagement with the bottom thereof, and a split annular resilient expander element formed of ribbon steel coiled edgewise disposed in said inwardly facing groove with its outer edge in radial supported engagement with the bottom of the groove, the sides of said cylinder wall engaging and expander elements being in axial supported relation with the sides of the grooves, whereby they are supported against dishing and kinking when the assembly is compressed within a cylinder wall with the inner edge of the expander element spaced from the bottom of a piston ring groove in which the assembly is installed, the said intermediate folds having angularly spaced slots therein providing drain openings.

2. A piston ring comprising an annular split combined carrier and spacer member formed of ductile ribbon stock folded longitudinally providing axially spaced side members adapted to coact with the side walls of a piston ring groove in which the assembly is installed and intermediate folds joined to the inner edges of the side members, the reaches of the intermediate folds adjacent the side members being disposed in spaced relation to the side members and coacting therewith to provide outwardly facing cylinder wall contacting element grooves, the fold reaches intermediate said parallel reaches being in axial thrust sustaining engagement with adjacent groove element reaches, annular thin split resilient cylinder wall engaging elements formed of ribbon steel coiled edgewise and of a thickness of the order of .010 to .016 of an inch disposed in said outwardly facing grooves in radial supported engagement with the bottoms thereof and in axial supported relation to the sides thereof whereby the cylinder wall engaging elements are supported against dishing and kinking when the assembly is compressed as within a cylinder wall, the said intermediate folds having angularly spaced slots therein providing drain openings.

3. A piston ring assembly comprising an annular split resilient carrier and spacer element formed of ductile metal stock folded reversely upon itself providing axially spaced side members adapted to coact with the side walls of a piston ring groove in which the assembly is installed, and connecting intermediate folds, the reaches of the folds adjacent the side members being disposed in spaced relation to the side members and coacting therewith to provide outwardly facing annular cylinder wall contacting element grooves, certain adjacent intermediate reaches of the folds of said carrier member being disposed in spaced relation providing an inwardly facing expander element receiving groove, the connecting reaches for said groove wall reaches constituting axial supporting abutments for the groove wall reaches, annular split resilient cylinder wall engaging elements formed of ribbon steel coiled edgewise and of a thickness of the order of .010 to .016 of an inch disposed in said outwardly facing grooves in axially supported engagement with the bottoms thereof and in side supported relation to the sides of the grooves whereby the cylinder wall engaging elements are supported against dishing and twisting when the assembly is compressed as when inserted in a piston ring groove and in operative relation to a cylinder, and a split annular expander element formed of ribbon steel coiled edgewise disposed in said inwardly facing groove and supported against dishing and kinking on the walls thereof.

4. A piston ring assembly comprising an annular split resilient carrier and spacer element formed of ductile metal stock folded longitudinally providing axially spaced side members adapted to coact with the side walls of a piston ring groove in which the assembly is installed, and connecting intermediate folds, the reaches of the folds adjacent the side members being disposed in spaced relation to the side members and coacting therewith to provide outwardly facing annular cylinder wall contacting element grooves, the said reaches being connected by reaches which constitute axial supporting abutments therefor, split resilient annular cylinder wall engaging elements formed of ribbon steel coiled edgewise and of a thickness of the order of .010 to .016 of an inch disposed in said outwardly facing grooves in axially supported engagement with the bottoms thereof and in side supported relation to the sides of the grooves whereby the cylinder wall engaging elements are supported against dishing and twisting when the assembly is compressed as when inserted in a piston ring groove and in operative relation to a cylinder.

5. A piston ring assembly comprising an annular split resilient carrier and spacer element formed of ductile stock folded reversely upon itself to provide axially spaced side members adapted to coact with the side walls of a piston ring groove in which the assembly is installed, and connecting intermediate folds integrally joined to the inner edges of the side members, the reaches of the folds adjacent the side members being disposed in spaced relation to the side members and coacting therewith to provide outwardly facing annular cylinder wall contacting element grooves, certain adjacent intermediate reaches of the folds of said carrier member being disposed in spaced relation providing an inwardly facing expander element receiving groove, annular split resilient cylinder wall engaging elements formed of ribbon steel coiled edgewise disposed in said outwardly facing grooves in axially supported engagement with the bottoms thereof and in side supported relation to the sides of the grooves whereby the cylinder wall engaging elements are supported against dishing and twisting when the assembly is compressed as when inserted in a piston ring groove and in operative relation to a cylinder, and a split annular resilient expander element formed of ribbon stock coiled edgewise disposed in said inwardly facing groove with its outer edge in radial supported engagement with the bottom of the groove, and its sides in supported relation to the sides thereof whereby it is supported against dishing and kinking.

6. A piston ring assembly comprising an annular split carrier and spacer element formed of ductile metal folded reversely upon itself to axially spaced side members adapted to coact with the side walls of a piston ring groove in which the assembly is installed and connecting intermediate folds joined to the inner edges of the side members, the adjacent reaches of the intermediate folds adjacent the side members coacting therewith to provide outwardly facing cylinder wall contacting element grooves, and annular split cylinder wall engaging elements formed of ribbon steel coiled edgewise and of a thickness of the order of .010 to .016 of an inch disposed in said grooves and in radial thrust engagement with the bottoms thereof and in side supported relation to the sides thereof whereby the cylinder wall engaging elements are supported against dishing and twisting when the assembly is compressed and the cylinder wall engaging elements are in thrust engagement with a cylinder wall.

7. A piston ring assembly comprising an annular split resilient carrier and spacer element formed of ductile metal folded to provide axially spaced parallel side members adapted to coact with the side walls of a piston ring groove in which the assembly is installed and connecting intermediate folds joined to the inner edges of the side members, the reaches of the intermediate folds adjacent the side members coacting therewith to provide outwardly facing cylinder wall contacting element grooves, and annular thin split resilient cylinder wall engaging elements formed of ribbon steel coiled edgewise disposed in said grooves and in radial thrust engagement with the bottoms thereof and in side supported relation to the sides thereof whereby the cylinder wall engaging elements are supported against dishing and twisting when the assembly is compressed and the cylinder wall engaging elements are in thrust engagement with a cylinder wall.

8. A piston ring assembly comprising an annular split springable carrier element formed of ductile metal folded reversely upon itself to provide an outwardly facing cylinder wall contacting element receiving groove, and an inwardly facing expander element receiving groove, an annular split cylinder wall engaging element formed of ribbon steel coiled edgewise and of a thickness of the order of .010 to .016 of an inch disposed in said outwardly facing groove with its inner edge in radially supported engagement with the bottom thereof, and an annular split resilient expander element formed of ribbon steel coiled edgewise disposed in said inwardly facing groove with its outer edge in radially supported engagement with the bottom thereof, the sides of said cylinder wall engaging and expander element grooves being in axial supported relation to the walls of the grooves in which they are disposed whereby they are supported against dishing and kinking when the assembly is compressed and under radial stress as in installed relation within a cylinder wall.

9. A piston ring assembly comprising an annular split resilient carrier element formed of ribbon stock folded longitudinally providing an outwardly facing cylinder wall contacting element receiving groove, and an inwardly facing expander receiving element groove, an annular split resilient cylinder wall engaging element formed of ribbon steel coiled edgewise disposed in said outwardly facing groove, and an annular split resilient annular expander element formed of ribbon steel coiled edgewise to provide axially spaced flat parallel sides, said expander element being disposed in said inwardly facing groove with its outer edge in radial thrust engagement with the bottom of the groove, said cylinder wall engaging and expander elements being in axial supported relation to the sides of the grooves in which they are installed whereby they are supported against dishing and kinking when the assembly is compressed as within a cylinder wall.

10. A piston ring assembly comprising an annular split resilient carrier element formed of ribbon stock folded longitudinally providing an outwardly facing cylinder wall contacting element receiving groove, and an inwardly facing expander receiving element groove, an annular split resilient cylinder wall engaging element disposed in said outwardly facing groove, and a substantially radially flat annular split resilient annular expander element disposed in said inwardly facing groove the opposite side walls of said inwardly facing groove constituting the sole means for supporting said expander element against axial displacement relative to said carrier element.

11. A piston ring assembly comprising an annular split carrier and spacer member formed of ductile metal folded upon itself to provide side members adapted to coact with the side walls of a piston ring groove in which the assembly is installed and connecting intermediate folds joined to the inner edges of the side members, the reaches of an intermediate fold adjacent one of the side members coacting therewith to provide an outwardly facing cylinder wall contacting element groove, and an annular split cylinder wall engaging element formed of ribbon stock coiled edgewise and of a thickness of the order of .010 to .016 of an inch disposed in said groove in radial thrust engagement with the bottom thereof and in side supported relation to the sides thereof whereby the cylinder wall engaging element is supported against dishing and twisting when the assembly is compressed with the cylinder wall engaging element under thrust engagement with a cylinder wall.

12. A piston ring assembly comprising an annular split springable carrier element having an inwardly facing expander element receiving groove of substantial depth and having parallel side walls, and an outwardly facing cylinder wall contacting element groove, an annular split resilient cylinder wall contacting element disposed in said outwardly facing groove, and an annular split resilient expander element formed of ribbon steel coiled edgewise to provide axially spaced parallel sides, said expander element being of an axial thickness of the order of .010 to .020 of an inch and disposed in said inwardly facing groove in radial thrust expanding engagement with the carrier element when it is compressed and under radial stress as in installed relation within a cylinder wall, the sides of the expander element groove being in supporting relation to the expander element so that it is supported against dishing and kinking when the assembly is compressed.

13. A piston ring assembly comprising an annular split springable carrier element having an inwardly facing expander element receiving groove of substantial depth and having parallel side walls, and an outwardly facing cylinder wall contacting element groove, an annular split resilient cylinder wall contacting element disposed in said outwardly facing groove, and an annular split resilient expander element formed of ribbon steel coiled edgewise to provide axially spaced flat parallel sides, said expander element being disposed in said inwardly facing groove in radial thrust expanding engagement with the carrier element when it is compressed and under radial stress as in installed relation within a cylinder wall, the sides of the expander element groove being in supporting relation to the expander element so that it is supported against dishing and kinking when the assembly is compressed.

14. A piston ring assembly comprising an annular split springable carrier element having an outwardly facing cylinder wall contacting element groove, and an inwardly facing expander element receiving groove, said grooves being relatively deep and having parallel side walls, an annular split cylinder wall engaging element formed of ribbon steel coiled edgewise and of a thickness of the order of .010 to .016 of an inch disposed in said outwardly facing groove with its inner edge in radially supported engagement with the bottom thereof, and an annular split resilient expander element formed of ribbon steel coiled edgewise disposed in said inwardly facing groove with its outer edge in radially supported engagement with the bottom thereof, the sides of said cylinder wall engaging and expander element grooves being in axial supported relation to the walls of the grooves in which they are disposed whereby they are supported against dishing and kinking when the assembly is compressed and under radial stress as in installed relation within a cylinder wall.

HAROLD P. PHILLIPS.

REFERENCES CITED

The following references are of record in the file of this patent:

UNITED STATES PATENTS

| Number | Name | Date |
| --- | --- | --- |
| 2,317,580 | Bauer | Apr. 27, 1943 |
| 2,474,493 | Phillips | June 28, 1949 |